Nov. 13, 1923.  
G. G. SCHROEDER  
ROLLER HARROW  
Filed April 14, 1922  
1,474,294  
4 Sheets-Sheet 1
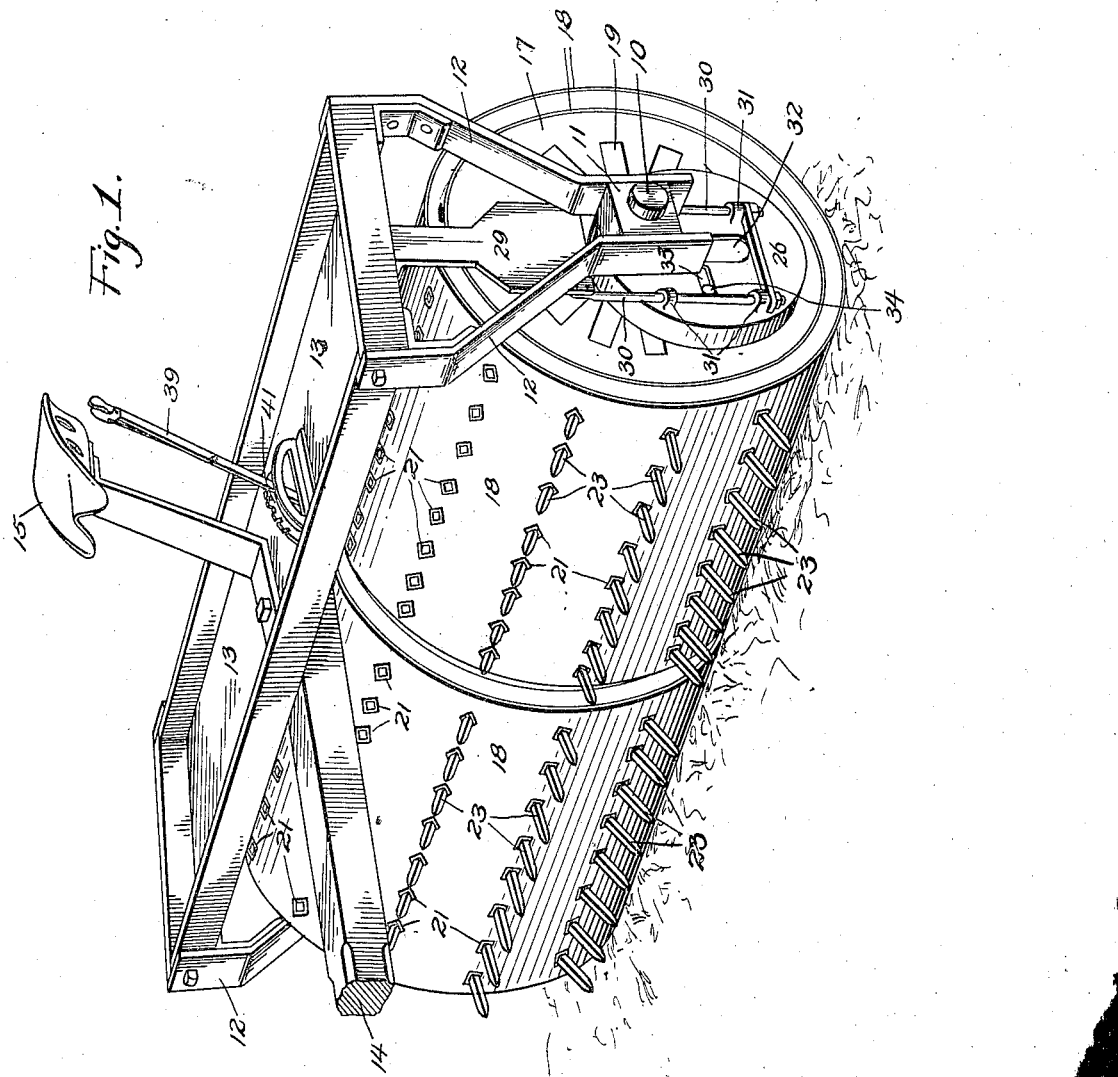

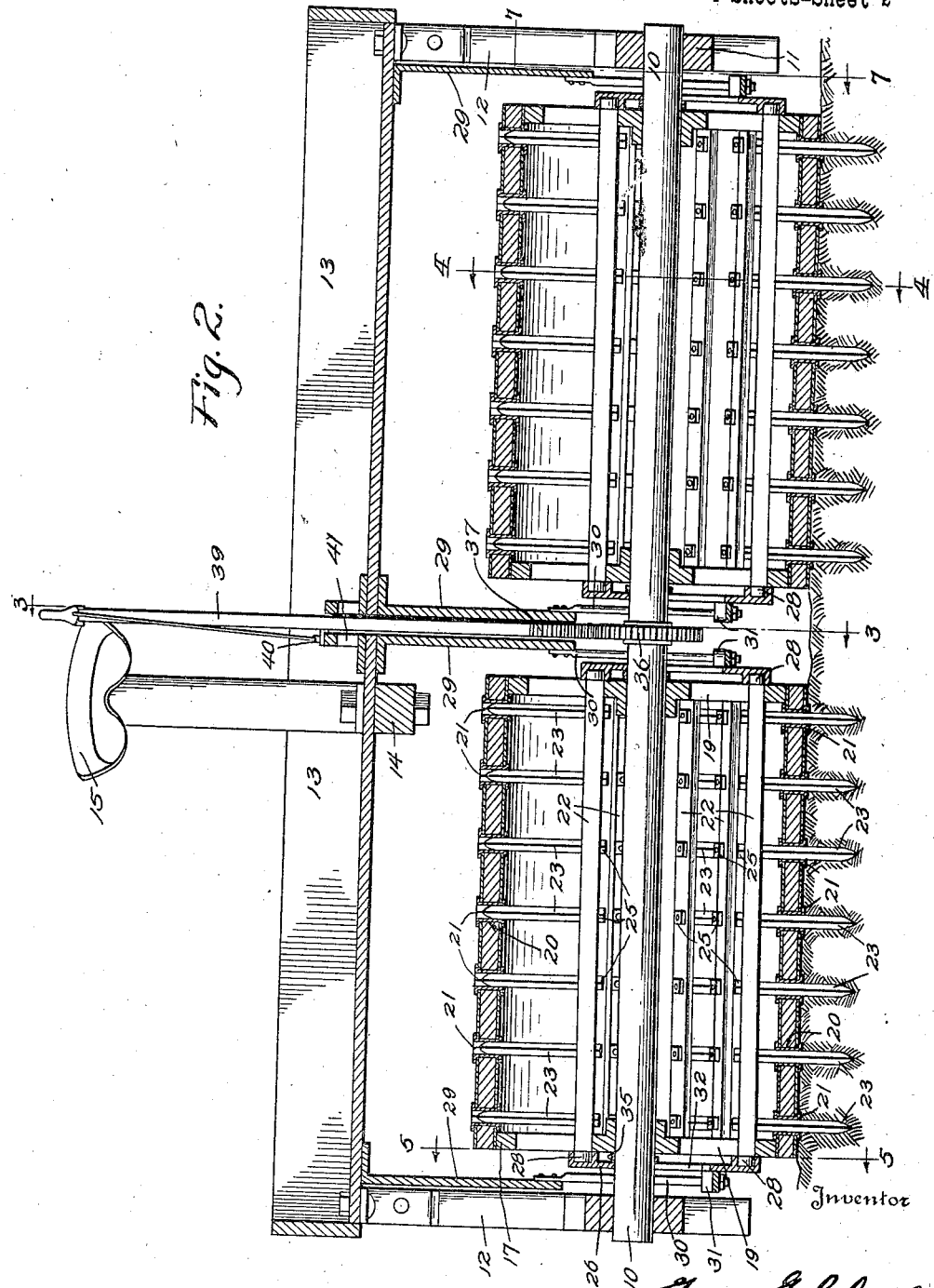

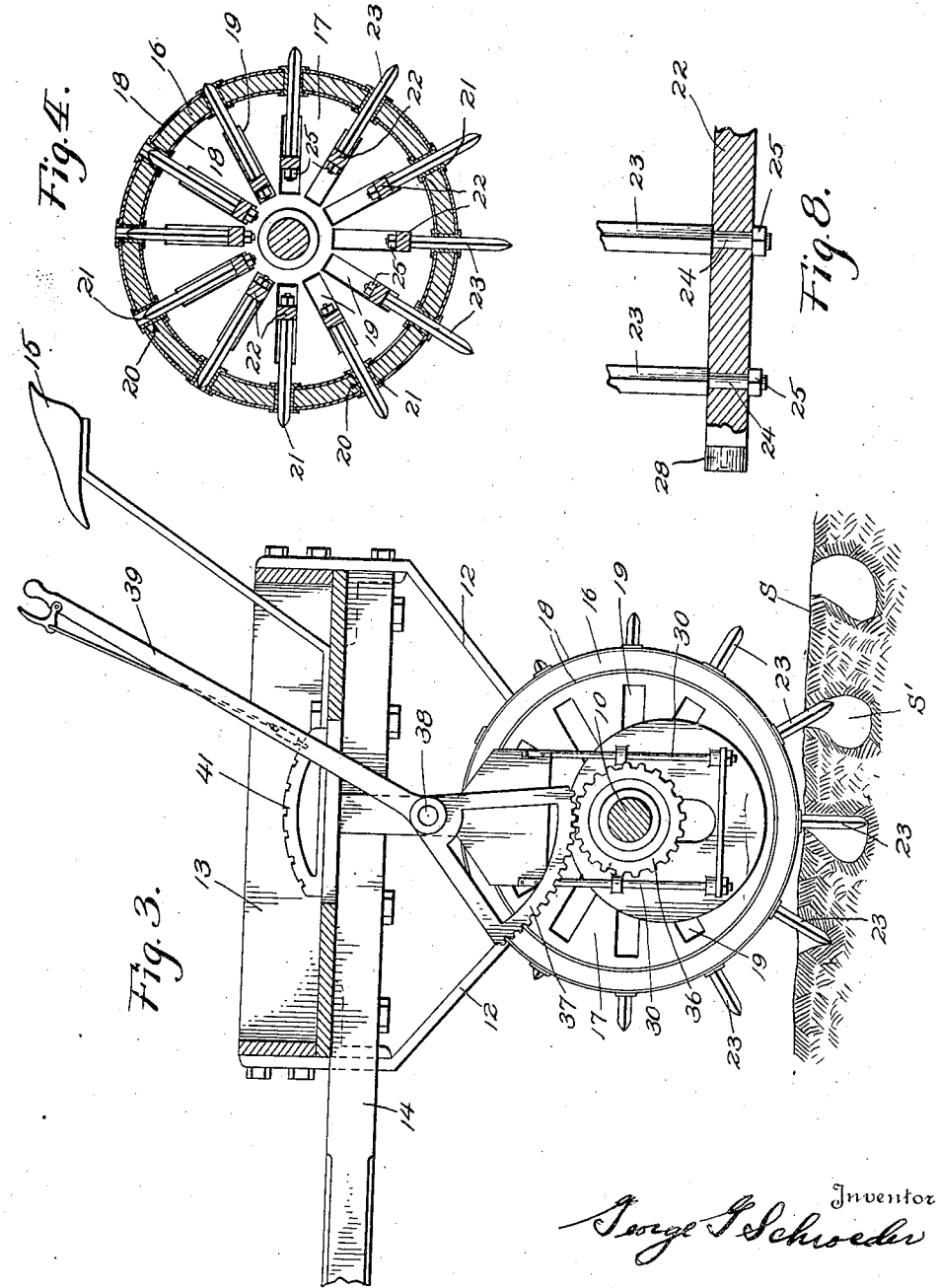

Nov. 13, 1923.
G. G. SCHROEDER
1,474,294
ROLLER HARROW
Filed April 14, 1922
4 Sheets-Sheet 4
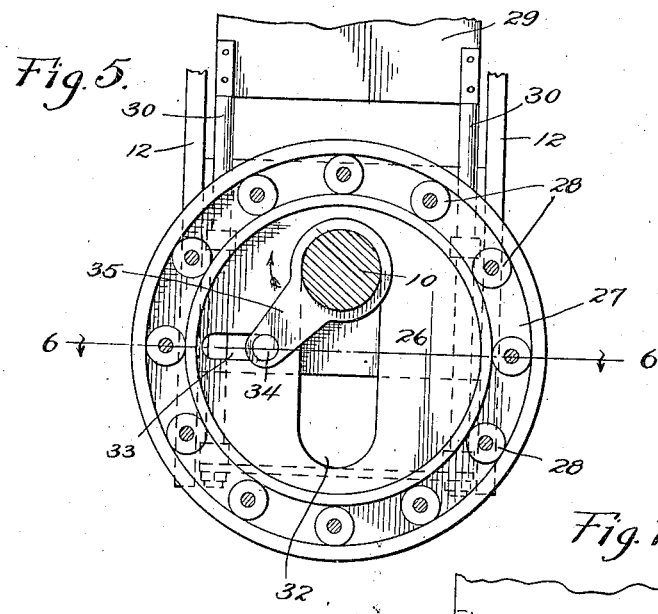
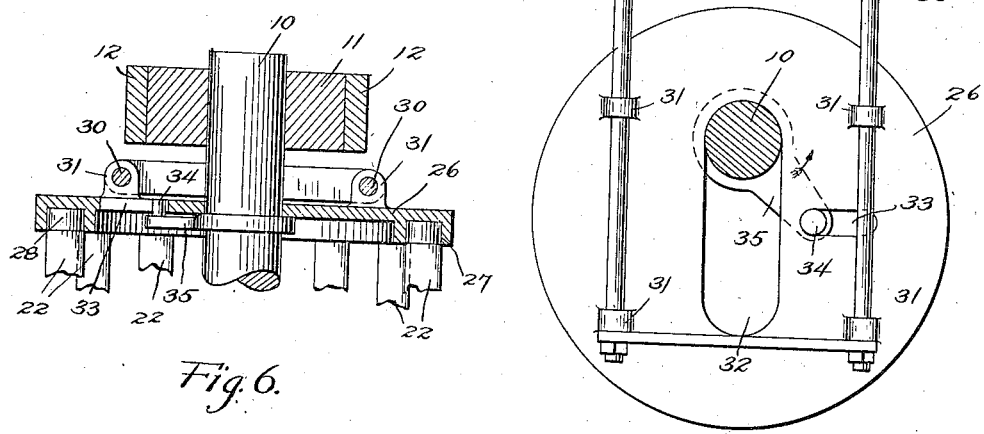
Inventor.
George G Schroeder
By Gross Collings
Attorneys Patented Nov. 13, 1923.

1,474,294

UNITED STATES PATENT OFFICE.

GEORGE G. SCHROEDER, OF WASHINGTON, DISTRICT OF COLUMBIA, ASSIGNOR TO ROLLER HARROW COMPANY, OF WASHINGTON, DISTRICT OF COLUMBIA, A CORPORATION OF DELAWARE.

ROLLER HARROW.

Application filed April 14, 1922. Serial No. 552,534.

*To all whom it may concern:*

Be it known that I, GEORGE G. SCHROEDER, a citizen of the United States, residing at Washington, District of Columbia, have invented certain new and useful Improvements in Roller Harrows, of which the following is a specification.

My invention relates to improvements in an agricultural implement and more especially in roller harrows, it consisting in the novel arrangement and construction of parts hereinafter described and claimed.

An object of my invention is to provide an improved roller harrow adapted to thoroughly and efficiently cultivate soils of all character and conditions. The invention has for a further object to provide an improved harrow which will pulverize and compress the soil sufficiently to form an advantageous dust mulch for conserving the moisture and which will operate to automatically provide reservoirs in the soil for retaining moisture.

In practice it has been found that when soil was in a proper state of moisture that it could be put in the best of tilth by plowing and harrowing. Furthermore it has been found that a deep soil of good tilth will absorb and hold for the use of plants a large part of the rainfall; that evaporation from soils can be lessened by covering them with mulch, and the best one and the only practical one on a large scale is a soil mulch.

From the use of a harrow constructed in accordance with my present invention, this advantageous soil mulch is produced.

Modern investigation reveals the fact that soil requires tilth for two important reasons, first, to increase the porosity, and second, to aerate the soil. The second reason is sustained by the fact that oxygen is necessary for the direct use of plants through the roots. The roots cannot grow and extend into the soil to find water and food constituents except in the presence of oxygen.

The porosity of the soil is increased mainly in proportion to the amount the soil is tilled and this tillage has two important effects. First, the soil is brought into the desired condition already described so that there will be a deep, mellow but firm seed and root bed to absorb the rainfall, and second, the loss of water by evaporation from the soil is retarded.

When the soil is porous the greater part of the water that falls as rain passes into the pores thereof. This capillary water is held by the soil particles against the forces of gravity and cannot be seen as liquid water, but its presence may be recognized by its effect upon the color of the soil. In dry weather capillary water evaporates from the surface of the soil, the soil drawing more water from below but not a sufficient quantity to wholly replace that lost by evaporation and there is therefore, a continual decrease in the content of capillary water until another rainfall.

It is from capillary water that agricultural plants, for the most part, obtain the water necessary to their growth. In order that they may make the best development, soil must be in such physical condition that the roots of plants can readily penetrate it and it must contain sufficient capillary water to supply the needs of the plants and this water must be renewed as it is taken up.

In accordance with my present invention, pockets are formed in the soil in the vicinity of the surface thereof, which pockets store up the water which supplies the capillary water which is lost by evaporation.

This latter object of my invention is made possible by the provision of a plurality of shiftable harrow teeth which may be caused to eccentrically project from the harrow body so as to engage the soil and form therein moisture retaining pockets.

The specific structure, combination and arrangement of parts of my invention whereby the desideratum outlined hereinbefore is brought about will be made more apparent in the accompanying specification and drawings wherein:

Fig. 1 is a perspective view of a roller harrow constructed in accordance with my invention, Fig. 2 is a longitudinal vertical section therethrough, Fig. 3 is a transverse section taken on line 3—3 of Fig. 2, Fig. 4 is a transverse section taken on line 4—4 of Fig. 2, Fig. 5 is a section taken on line 5—5 of Fig. 2, Fig. 6 is a section taken on line 6—6 of Fig. 5, Fig. 7 is a section taken on line 7—7 of Fig. 2, and, Fig. 8 is a detail view of the teeth-carrying bar.

In the accompanying specification wherein like reference characters indicate like parts, the reference character 10 indicates an axle mounted in boxes 11, which boxes 11 are supported by the brackets 12 depending from the bed or platform 13 of the harrow.

As will be immediately obvious, the weight of the harrow may be increased as occasion demands by placing weights or the like, upon the bed or platform 13. To this platform 13 there is secured a draft-tongue 14 and a driver's seat 15.

Mounted to rotate upon the main axle 10 is a pair of pulverizing drums 16, provided with end plates 17. By referring particularly to Fig. 4 it will be seen that each drum 16 is faced on its outer and inner surface with metal plates 18, the body portion of each drum being formed preferably of longitudinally extending wooden strips. By encasing these wooden strips in the metal housing, formed by the facing plates 18, a strong and durable structure is provided, without, however, increasing the weight of the pulverizing drums to a prohibitive extent.

Each end plate 17 is provided with a plurality of radially extending slots 19, see particularly Figs. 1 and 4, for a purpose to be more fully hereinafter described. Also, each drum is further provided with a plurality of longitudinally and circumferentially extending rows of apertures 20. Into these apertures there are inserted thimbles or sleeves 21, flanged at one end thereof, and these slots or thimbles are thereafter flanged at their other ends, whereupon they are firmly secured in place, and also act as fastening means for the facing plates 18. This structure is illustrated particularly in Fig. 4.

Associated with each pulverizing drum 16 is a plurality of harrow-teeth supporting bars 22, see particularly Figs. 4 and 8. to each of which there is removably secured a plurality of harrow teeth 23. Each harrow tooth is formed with a reduced shank 24 which projects through openings in the harrow-teeth supporting bars, and these harrow teeth are rigidly secured to their associated bars by lock nuts 25. Thus, when a harrow tooth becomes dull or broken, it may be removed and replaced by a new one.

The harrow teeth of each bar 22 are adapted to project through a longitudinal row of the openings in the pulverizing drum, and for guiding these harrow teeth their associated bars 22 project through the radially disposed slots 19 in the end plates 17. It is the purpose of my invention to provide means for eccentrically projecting the harrow teeth through the outer surface of the pulverizing drums, and for this purpose I provide a plurality of guide-plates 26, formed with annular guide-ways 27. Each harrow-tooth carrying bar 22 is provided with rollers 28, at the ends thereof, which enter these annular guide-ways for eccentrically projecting the harrow teeth in a manner to be made more apparent hereinafter.

The guide-plates 26 are supported by brackets 29 which depend downwardly from the bed or platform 13, one of these brackets being arranged at each end of the said platform, and two adjacent the center thereof, see particularly Fig. 2.

To each bracket 29 there is secured a pair of guide rods 30 which pass through eyes 31 preferably cast on one face of the guide-plate 26. These guide rods 30 pass freely through these eyes 31 so that the guide-plates 26 may be freely reciprocated vertically, and for this purpose I form in each guide-plate a centrally disposed vertical slot 32 and a short horizontal slot 33. The slots 32 are to enable the main axle 10 to pass through the plates 26, while each slot 33 is engaged by a pin 34, carried by a short crank arm 35 rigidly fixed to the main axle 10.

This structure is shown particularly in Figs. 5 and 7, and it will be obvious that upon a rotation of the main axle 10 in the direction of the arrow of Figs. 5 and 7, the guide-plates 26 will be moved upwardly. A vertical displacement of the guide-plates 26 affects the harrow teeth by causing them to project through the pulverizing drums to a greater or less degree, depending upon the position of the guide-plates 26 and their annular ways 27 which, as will be obvious, act as eccentric guide members for the teeth-carrying bars.

For rotating the main axle 10 to adjust the guide-plates 26 I provide a spur gear 36 keyed to the axle 10 and preferably at the center thereof, with which meshes a tooth segment 37 journaled as at 38 to the central brackets 29. An operating handle 39 is secured to the segment 37 for shifting the said segment angularly and for the purpose of securing the said segment in a plurality of adjusted positions I provide a latch 40 adapted to engage a latch segment 41 carried by the harrow body.

Obviously, therefore, the handle 39 and segment 37 may be moved to various adjusted positions and secured in any of these positions by means of the locking means 40-41. It will also be immediately obvious that an adjustment of the segment 37 will, through the medium of the spur gear 36, rotate the axle 10, which by reason of the lever arms 35 will displace the guide-plates 26 and guide-ways 27 vertically, thereby causing the harrow teeth to project into the soil to varied extents.

The operation of my improved harrow will now be briefly described:

The rotation of the pulverizing drums 16 and their slotted end plates 17 will cause the harrow-teeth carrying bars to travel in a circumferential path. The rollers 28 carried by the ends of these bars riding in the annular guide-ways 27. If, therefore, the operating lever 39 be in the position illustrated in Figs. 1 and 3 the guide-plates and annular ways will be caused to assume their lowermost position wherein the harrow teeth 23 will be fully projected through the pulverizing drums in their lowermost position thereby producing a maximum penetration of teeth in the soil.

In this position of the bars the harrow teeth will be fully drawn within the drums 16 at the top of these drums. The guide-ways 27 therefore, act as eccentric guiding members for causing a radial displacement of the tooth-carrying bars 22.

Obviously, these may be regulated by adjusting the control lever 39 and when this said lever is in its other extreme position the harrow teeth will be withdrawn within the outer periphery on the pulverizing drums 16 at the bottom of these drums, thereby preventing a penetration of the soil by the teeth and enabling my improved construction to be used as a crushing or pulverizing roller.

The manner in which the pockets are formed in the soil by the harrow teeth 23 is made more apparent in Fig. 3 wherein it is seen that the teeth first enter the soil S at an angle. Then as each tooth assumes the position illustrated by the lowermost tooth in Fig. 3 the portion of the tooth adjacent the outer periphery of the drum 16 acts as a temporary center-point, the movement of the tooth extending from this point, thereby producing during its swinging motion a pocket, having a restricted mouth and an enlarged bottom.

During the continued rotation of the pulverizing drums 16 the tooth is withdrawn at an angle opposed to the angle with which the tooth entered the ground and without materially increasing the size of the mouth of the pocket, S', formed thereby. Obviously, therefore, when the bars have been adjusted to cause a penetration of said teeth into the soil, a plurality of moisture gathering and retaining pockets S' will be formed in the soil adjacent the surface thereof.

It should be noted in the foregoing structure that the close proximity of the actuating annular guide-ways 27 to the radially disposed slots 19 formed in the end plates 17, closely positions the forces acting on the respective ends of the harrow-teeth carrying bars 22 in the axial planes of said supports, thereby avoiding all excessive or binding strains on these bars 22 during actuation of the harrow teeth.

While the structure herein described and illustrated has been found by experience to be durable, practical, and efficient in every respect, I do not wish to be necessarily limited as to details of construction and the particular arrangement of parts illustrated, but reserve the right to make such changes and modifications as may come within the requirements of the accompanying claims.

Having thus described by invention what I claim is:

1. In a roller-harrow, the combination of a pulverizing drum, sets of harrow teeth extending slidably through said drum, independent bars secured to the several teeth of the respective sets, and adjustable means for automatically reciprocating said bars upon rotation of said drum.

2. In a roller-harrow, the combination of a pulverizing drum, sets of harrow teeth extending slidably through said drum, bars secured to the several teeth of the respective sets, cams engaging said bars for automatically reciprocating the latter upon rotation of said drum, means for angularly adjusting said cams, and means for locking said cams in their several adjusted positions.

3. In a roller-harrow, the combination of a dead axle, a pulverizing drum rotatably mounted thereon, harrow teeth extending slidably through said drum, eccentrics secured on said axle, means for adjusting the position of said eccentrics, and connections between said eccentrics teeth for automatically reciprocating the latter upon rotation of said drum.

4. In a roller-harrow, the combination of a dead axle, a pulverizing drum rotatably mounted thereon, harrow teeth extending slidably through said drum, eccentrics secured on said axle, connections between said eccentrics and teeth for automatically reciprocating the latter upon rotation of said drum, a frame supported on said axle, and means on said frame for angularly adjusting said axle.

5. In a roller-harrow, the combination of a pulverizing drum, harrow teeth movably mounted thereon, actuating means exterior to said drum for automatically shifting said teeth, and means for adjusting said actuating means.

6. In a roller-harrow, the combination of a pulverizing drum, sets of harrow teeth movably mounted thereon, independent supports for said several sets of teeth, actuating means exterior to said drum engaging said supports for automatically shifting the latter and means for adjusting the position of said actuating means.

7. In a roller-harrow, the combination of a pulverizing drum, guides carried thereby, supports slidably mounted in said guides, sets of harrow teeth on the respective supports, common actuating means exterior to said drum engaging said several supports for automatically shifting the latter and means for adjusting said actuating means for varying the throw of said harrow teeth.

8. In a roller-harrow, the combination of a pulverizing drum, slotted heads secured thereto, supports extending slidably through said slotted heads, and adjustable actuating means supported adjacent to the outer faces of said drum heads in engagement with said supports for automatically shifting the latter.

9. In a roller-harrow, the combination of a harrow body, an axle rotatably mounted thereon a pulverizing drum rotatably mounted on said axle, harrow teeth movably mounted on said drum, actuating means mounted on said body for automatically shifting said teeth and means actuated by the rotation of said axle for adjusting said actuating means.

10. In a roller-harrow, the combination of a harrow body, an axle mounted thereon, a pulverizing drum on said axle, slotted heads on said drum, supports extending slidably through said slotted heads, harrow teeth on said supports, and variable actuating means secured to said harrow body in engagement with said supports.

11. In a roller-harrow, the combination of a harrow body, an axle adjustably mounted thereon, a pulverizing drum rotatably mounted on said axle, slotted heads on said drum, supports extending slidably through said slotted heads, harrow teeth on said supports, actuating means adjustably secured to said harrow body in engagement with said supports, and means for shifting said axle to adjust said actuating means.

12. In a roller-harrow, the combination of a harrow body, an axle mounted thereon, a pulverizing drum on said axle, slotted heads on said drum, annular ways secure to said harrow body, bar supports slidably mounted in said slotted heads and extending within said annular ways, harrow teeth on said supports and means for adjusting the position of said annular ways.

13. In a roller-harrow, the combination of a harrow body, an axle adjustably mounted thereon, a pulverizing drum rotatably mounted on said axle, slotted heads on said drum, annular ways adjustably secured to said harrow body, bar supports slidably mounted in said slotted heads and extending within said annular ways, harrow teeth on said supports, connections between said axle and annular ways, and means for shifting said axle to adjust said annular ways.

In testimony whereof I affix my signature.

GEORGE G. SCHROEDER.